2 Sheets—Sheet 1.

M. S. HILL.
LAND-HARROW.

No. 174,362.

Patented March 7, 1876.

Attest:
A. F. Cornell

Inventor:
M. S. Hill
per Burridge & Co
Att'ys

M. S. HILL.
LAND-HARROW.

No. 174,362.

2 Sheets—Sheet 2.

Patented March 7, 1876.

UNITED STATES PATENT OFFICE.

MOSES S. HILL, OF NORWALK, OHIO.

IMPROVEMENT IN LAND-HARROWS.

Specification forming part of Letters Patent No. 174,362, dated March 7, 1876; application filed November 20, 1875.

*To all whom it may concern:*

Be it known that I, MOSES S. HILL, of Norwalk, in the county of Huron and State of Ohio, have invented a certain new and Improved Land-Harrow; and I do hereby declare that the following is a full, clear, and complete description thereof, reference being had to the accompanying drawings, making a part of the same.

Figure 1:
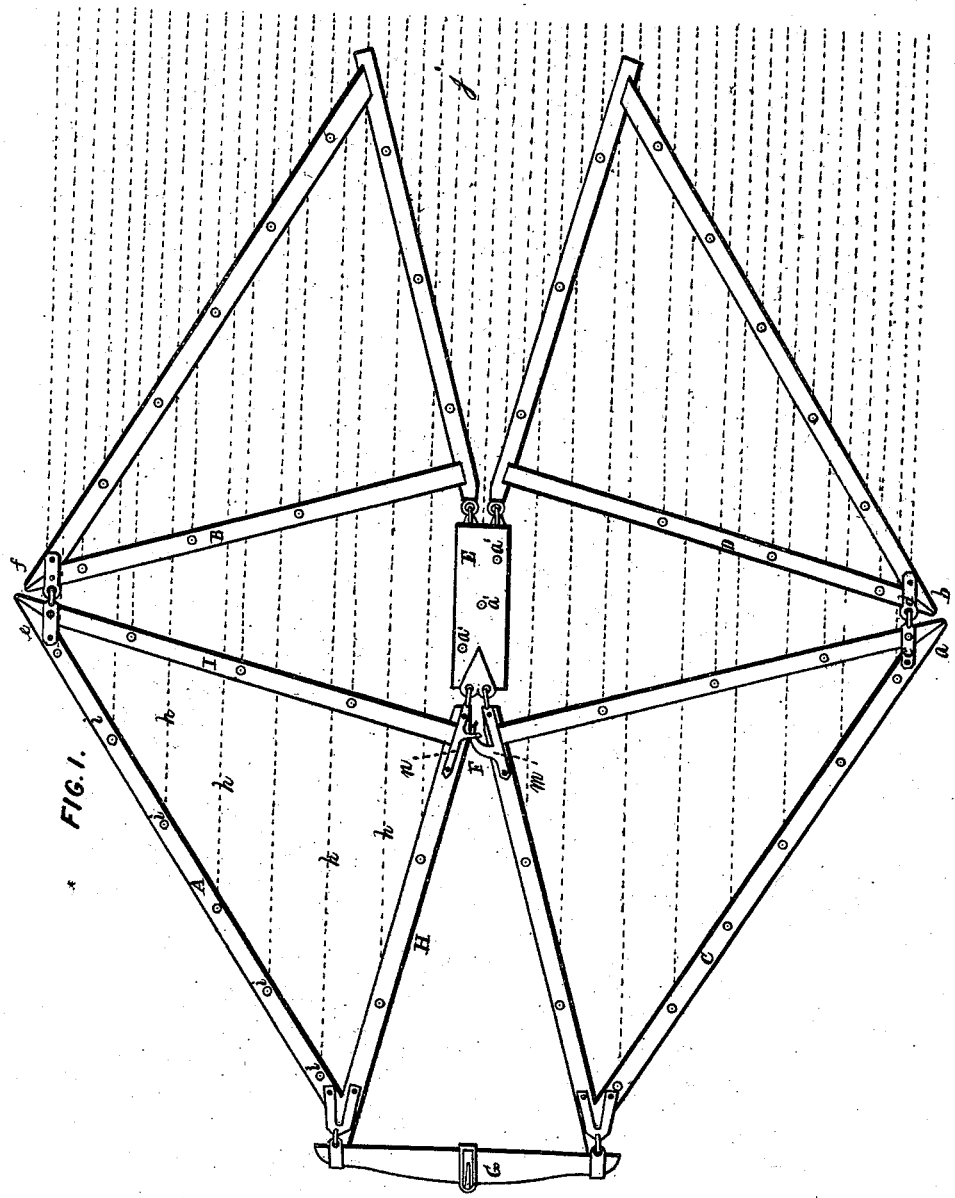

The nature of this invention relates to a harrow, the construction and operation of which are substantially as follows:

Said harrow consists of four triangular sections, A B C D, Figure 1, arranged and connected to each other, as shown in said Fig. 1, wherein it will be seen that the outer corners *a b* of the sections C D are connected to each other by hook and eye *c d*, thereby admitting a free movement of the two corners. The two outer corners *e f* of sections A B are connected to each other in the same manner. The inner corners or angles of sections B D are loosely connected to a center block, E; also, the inner angles of the sections A C are connected in the same way to the opposite end of the block E, and also to each other, as will be seen at F, by a hook and eye, *m n*, as shown in the drawing. G is a draw-bar attached to the front ends of the sections A C, and whereby the harrow is drawn by hitching a team thereto in the ordinary way.

It will be observed that the sections A B are duplicates of sections C D, and that they hold the same relation to and arrangement with the center block.

The disposition of the teeth (in respect to each other) in the sides composing the sections will be readily understood by the dotted lines in Fig. 1, in which it will be seen that the teeth *i* in the front side of section A and its inner side H are so set as to make markings far apart, as indicated by the dotted lines *h*.

The teeth in the side I of section A, and the teeth in the sides of section B, are so arranged in their relation to the teeth *i* as to fill up the spaces between their markings, so that the ground, when passed over by the harrow, will leave it marked in close lines, as though gone over by a fine-toothed harrow, as will be seen by the dotted lines *j* in the rear of the implement.

The teeth in the sections C D are arranged, in respect to each other, in the same way, and perform the same fine harrowing. The space between the sections lying on either side of the block E is harrowed by the teeth *a'*, inserted in the block, and which are in such relation to the other teeth of the harrow as to mark the same degree of fineness, as will be seen in the drawing.

Figure 2:
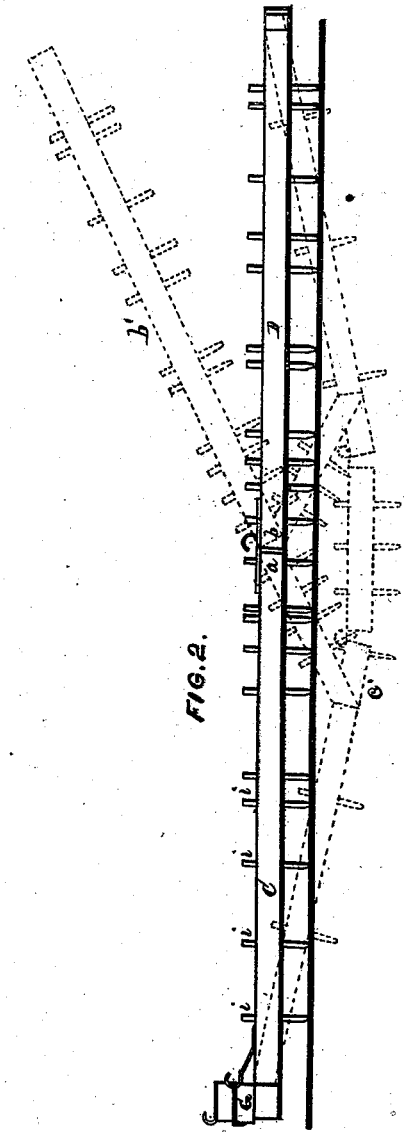

The object in constructing the harrow in four sections, and connecting the inner corner or angle of each section to a center block, as herein described, is to render it adaptable to uneven ground, so that on passing over a depression or hollow the harrow will drop down therein, as indicated by the dotted lines *c'*, in Fig. 2; or, in the event it passes over a swell or hummock, it will be lifted in the middle correspondingly, or one or more of the sections will be lifted, as indicated by the dotted lines *b'* in Fig. 2.

Whatever may be the character of the ground as to hollows, ridges, furrows, and hummocks, the flexible character of the implement will render it readily adaptable thereto, so that the whole surface of the ground will be stirred by the harrow, and as thoroughly as if gone over by a fine-toothed implement. In this particular the harrow acts as a coarse and a fine one, the sections A C doing the rough or first harrowing, and then followed by the sections B D, reducing it to a fine condition.

It will be seen that none of the teeth are close together, like that of a fine-toothed harrow; hence, clods of dirt, grass, and stones will not lodge in the teeth, they being so far apart that such obstructions readily pass between them, instead of being caught by them and carried along, thereby plowing deep, wide furrows, and pushing the earth forward, making the harrow draw heavily.

The harrow is easily handled for transportation, as each section can be readily detached from the other, so that it can be easily put into a wagon, to be carried into or from the field.

What I claim as my invention, and desire to secure by Letters Patent, is—

The sections A B, as arranged in relation to each other, and in combination with sections C D and center block E, substantially as described.

MOSES S. HILL.

Witnesses:
J. H. BURRIDGE,
W. R. LANSING.